Figure 1:
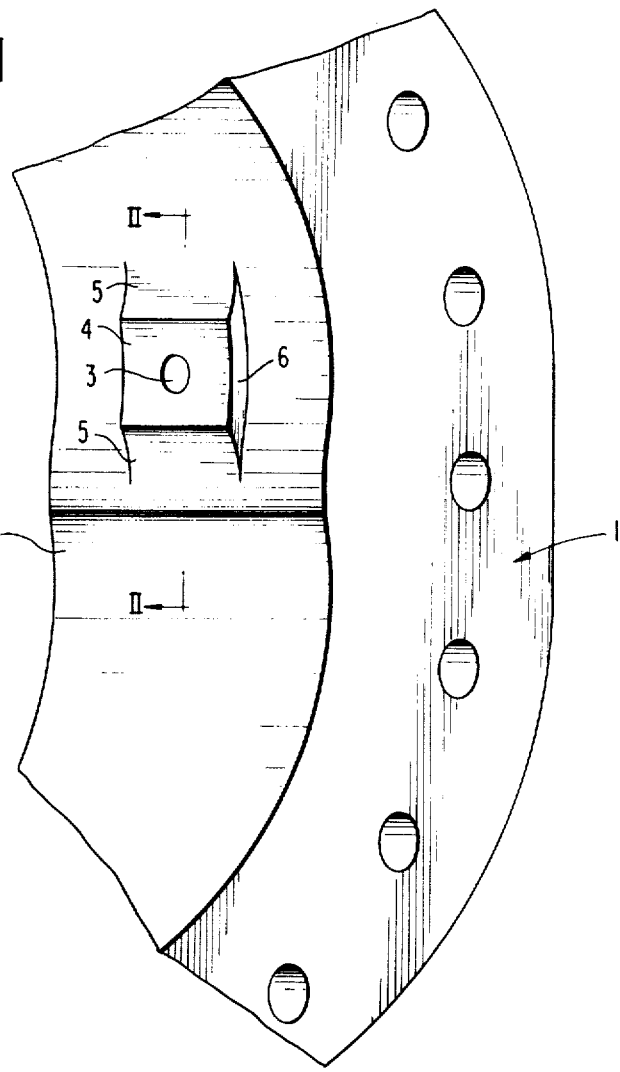

United States Patent [19]
Dobler

[11] 3,892,028
[45] July 1, 1975

[54] METHOD FOR PRODUCING A HOUSING CASING FOR A ROTARY PISTON INTERNAL COMBUSTION ENGINE

[75] Inventor: Helmut Dobler, Esslingen, Germany

[73] Assignee: Daimler-Benz Aktiengesellschaft, Germany

[22] Filed: Feb. 1, 1973

[21] Appl. No.: 328,534

[30] Foreign Application Priority Data
Feb. 1, 1972  Germany............................ 2204560

[52] U.S. Cl. ........ 29/156.4 WL; 29/527.4; 418/178; 123/8.01
[51] Int. Cl. ...................... B23p 15/00; B23p 13/00
[58] Field of Search ........ 29/156.4 WL, 527.1, 424, 29/527.4; 123/8.01, 8.09; 418/178

[56] References Cited
UNITED STATES PATENTS

| | | | |
|---|---|---|---|
| 3,133,341 | 5/1964 | Marien............................. | 29/527.4 |
| 3,359,615 | 12/1967 | Bauer................................ | 123/8.01 |
| 3,512,907 | 5/1970 | Belzner............................. | 418/113 |
| 3,722,480 | 3/1973 | Berkowitz........................ | 123/8.01 |

FOREIGN PATENTS OR APPLICATIONS
470,364  12/1950  Canada.............................. 29/527.4

*Primary Examiner*—C. W. Lanham
*Assistant Examiner*—Dan C. Crane
*Attorney, Agent, or Firm*—Craig & Antonelli

[57] ABSTRACT

A method for manufacturing a housing casing for a rotary piston internal combustion engine, especially of trochoidal construction, as well as the housing casing made according to this method, whereby the housing casing consists of light metal whose internal running surface for the piston consists of a coating of hard material; the method thereby involves leaving during the machining of the inner wall of the housing casing a material island of such light metal about the discharge opening of the already bored or still to be bored spark-plug-firing channel, whose height corresponds at least to the thickness of the coating to be subsequently provided along the inner contour of the housing casing in the finish-machined condition; as a result thereof the area of the discharge opening of the firing channel is constituted exclusively of such light metal.

3 Claims, 2 Drawing Figures

3,892,028

METHOD FOR PRODUCING A HOUSING CASING FOR A ROTARY PISTON INTERNAL COMBUSTION ENGINE

The present invention relates to a method for the manufacture of a housing casing for a rotary piston internal combustion engine, especially for an internal combustion engine of trochoidal type of construction, which consists of light metal and in which the running surface for the piston, in which terminates a spark plug-firing channel, consists of a coating of a hard material.

With the rotary piston internal combustion engines having housing casings of the type described above, the high temperatures within the area of the spark-plug-firing channel at the discharge orifice or mouth of the spark-plug-firing channel become effective as high circumferential compressive stresses. Though the more expansible light metal is able to follow this pressure stress or compressive stress, the coating of hard metal is not able to do so. The disadvantageous consequence is that cracks form in the coating within the area of the mouth of the spark-plug-firing channel, which by reason of the good adherence of the coating on the light metal, continue up to and into the latter. If these cracks reach cooling water spaces in the housing casing, then water penetrates into the working chambers of the internal combustion engine.

The present invention is concerned with the task to so construct a housing casing that the described disadvantages no longer can arise. The underlying problems are solved according to the present invention in that during the machining of the inner wall of the housing casing, a material island of the light metal material of the housing casing is left standing about the mouth of the already bored or yet to be bored spark-plug-firing channel, whose height corresponds at least to the thickness of the coating to be provided at the inner wall in the machined condition.

As a result of the measure according to the present invention, light metal is present in the running surface for the piston about the mouth of the spark-plug-firing channel so that no cracks can occur in the endangered area as occur with the use of materials of different thermal expansion.

In an advantageous construction of the present invention, the coating of the inner wall of the housing casing can be realized also over the material island and the portion of the coating lying on the material island can then be removed during the finish-machining of the running surface formed by the coating. These measures are recommended in particular when the coating is applied galvanically and a covering of the material island is either not possible or not appropriate.

The housing casing can be constructed in a simple manner such that the material island has a rectangular or square surface and includes four side walls of which two slope off continuously in the circumferential direction and of which the other two drop off steeply in the axial direction.

Accordingly, it is an object of the present invention to provide a method for manufacturing a housing casing for a rotary piston internal combustion engine and a housing casing made according to such method which avoid by simple means the aforementioned shortcomings and drawbacks encountered in the prior art.

Another object of the present invention resides in the method of manufacturing a housing casing for a rotary piston internal combustion engine and a housing casing made according to such method which minimizes the formation of cracks within the area of the orifice of the spark-plug-firing channel, thereby minimizing the danger of leakage of cooling water into the working chambers of the engine.

A further object of the present invention resides in a method for manufacturing a housing casing for a rotary piston internal combustion engine which is simple, permits the use of few, simple steps to achieve the finished product and involves practically no additional operating steps of any significance to achieve the final product.

Still another object of the present invention resides in a housing casing for a rotary piston internal combustion engine which excels by great resistance to the crack formation, especially within the area of the discharge end of the firing channel of the spark plug.

Figure 2:
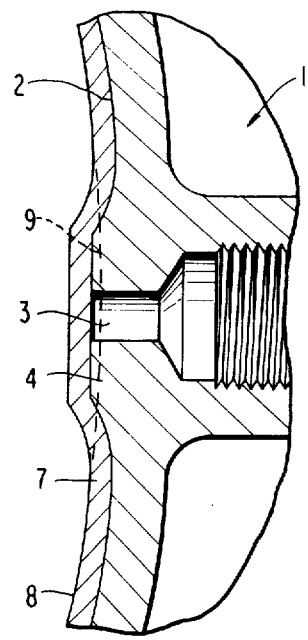

These and further objects, features and advantages of the present invention will become more apparent from the following description when taken in connection with the accompanying drawing which shows, for purposes of illustration only, one embodiment in accordance with the present invention, and wherein:

FIG. 1 is a partial perspective view of a housing casing consisting of light metal; and FIG. 2 is a cross-sectional view, on an enlarged scale, through the housing casing with an applied coating, taken along line II—II of FIG. 1.

Referring now to the drawing wherein like reference numerals are used throughout the two views to designate like parts, and more particularly to FIG. 1, the housing casing generally designated in this figure by reference numeral 1 for an otherwise conventional rotary piston internal combustion engine of trochoidal construction consists of light metal, for example, of aluminum and its inner wall 2 is machined according to a trochoidally shaped contour in order that a layer or coating of hard metal serving as running surface for the piston of the internal combustion engine, for example, a galvanically applied layer of a material containing essentially nickel, can be provided. In order to have only light metal and no hard metal present within the area about the discharge orifice or mouth of the already bored or possibly still to be bored spark plug-firing channel 3 after the attachment of the coating of hard metal, a material island 4 with rectangular or square surface has been left standing during the machining of the inner wall 2, whose height corresponds at least to the thickness of the coating to be applied. The side walls 5 of the material island 4 pass over into the inner wall 2 sloping off or dropping off continuously in the circumferential direction of the housing casing 1, i.e., by a smooth curvature whereas the side walls 6 drop off steeply in the axial direction (FIG. 1).

After the application of the coating 7 of hard metal, the arrangement results which can be seen from FIG. 2. The coating 7 of hard metal of any conventional, known type, covers both the inner wall 2 as also the material island 4. During the machining of the running surface 8 for the piston on the coating 7, the portion of the coating 7 covering the material island 4 and a portion of the material island 4 possibly projecting beyond the running surface 8 are removed according to the line indicated in dash and dot lines of FIG. 2 so that after the finish-machining of the running surface 8, the latter consists of light metal about the discharge orifice of the spark-plug-firing channel 3. The hard running-surface portions begin only at a certain distance from the discharge opening or mouth of the spark-plug-firing channel 3.

With the arrangement of several spark-plug-firing channels in one and the same engine, a common material island can be provided for these several spark-plug-firing channels or a separate material island may be provided for each spark-plug-firing channel.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A method for producing a housing casing for a rotary piston internal combustion engine, the engine casing consisting of a light metal and including a piston running surface consisting of a coating of a hard material, and a spark-plug-firing channel terminating in the piston running surface, the method comprising the steps of: machining the inner wall of the housing casing to a predetermined contour, leaving during the machining of the inner wall of the housing casing a material island of the light metal material of the housing casing projecting out from the inner wall of the housing casing within the area assigned to the discharge opening of the spark-plug-firing channel, providing a coating of hard material along the inner contour of the housing casing material along the inner contour of the housing casing in the machined condition, said material island having a height corresponding at least to the thickness of said coating material, applying the coating of the hard material provided along the inner contour of the housing casing also over the material island, and removing the portion of the hard material coating lying on the material island during the finish-machining operation of the running surface formed by the hard material coating.

2. A method according to claim 1, characterized in that the firing channel is bored prior to the machining of the inner wall providing the material island.

3. A method according to claim 1, characterized in that the spark-plug-firing channel is bored only after the formation of the material island.

* * * * *